(12) United States Patent
Lenkl

(10) Patent No.: US 8,675,240 B2
(45) Date of Patent: Mar. 18, 2014

(54) THERMOTRANSFER PRINTER WITH SINGLE SHEET INTAKE MEANS

(75) Inventor: Johannes Lenkl, Freising (DE)

(73) Assignee: Avery Dennison Corporation, Glendale, CA (US)

( * ) Notice: Subject to any disclaimer, the term of this patent is extended or adjusted under 35 U.S.C. 154(b) by 1188 days.

(21) Appl. No.: 11/578,905

(22) PCT Filed: Apr. 19, 2005

(86) PCT No.: PCT/EP2005/004180
§ 371 (c)(1),
(2), (4) Date: Oct. 20, 2006

(87) PCT Pub. No.: WO2005/102719
PCT Pub. Date: Nov. 3, 2005

(65) Prior Publication Data
US 2007/0223014 A1    Sep. 27, 2007

(30) Foreign Application Priority Data
Apr. 20, 2004   (DE) .......................... 10 2004 019 070

(51) Int. Cl.
*G06K 15/00*    (2006.01)
(52) U.S. Cl.
USPC ..................................................... 358/1.18
(58) Field of Classification Search
USPC .................................. 358/1.1, 1.15; 347/200
See application file for complete search history.

(56) References Cited

U.S. PATENT DOCUMENTS

| | | | | |
|---|---|---|---|---|
| 5,587,812 A | * | 12/1996 | Kasuya | 358/498 |
| 6,052,139 A | * | 4/2000 | Hetzer | 347/200 |
| 6,317,028 B1 | * | 11/2001 | Valiulis | 340/10.1 |
| 6,400,272 B1 | * | 6/2002 | Holtzman et al. | 340/572.1 |
| 7,679,795 B2 | * | 3/2010 | Oki | 358/518 |
| 2002/0080224 A1 | * | 6/2002 | Forster | 347/217 |
| 2002/0126013 A1 | * | 9/2002 | Bridgelall | 340/572.1 |
| 2002/0170973 A1 | * | 11/2002 | Teraura | 235/492 |
| 2002/0191998 A1 | * | 12/2002 | Cremon et al. | 400/76 |
| 2003/0001009 A1 | * | 1/2003 | Collins et al. | 235/385 |

FOREIGN PATENT DOCUMENTS

DE    100 52 444    5/2002

* cited by examiner

*Primary Examiner* — Jeremiah Bryar
(74) *Attorney, Agent, or Firm* — Avery Dennison Corporation

(57) ABSTRACT

The present invention concerns a thermotransfer printer for printing print media having RFID labels, comprising a thermotransfer printing unit, and a single sheet intake means. The invention is further characterised by an RFID reading unit for reading items of information from the RFID labels, wherein the RFID reading unit is so connected to the thermotransfer printing unit (70) that the thermotransfer printing unit (70) is controllable in dependence on the items of information read out of the respective RFID label.

17 Claims, 1 Drawing Sheet

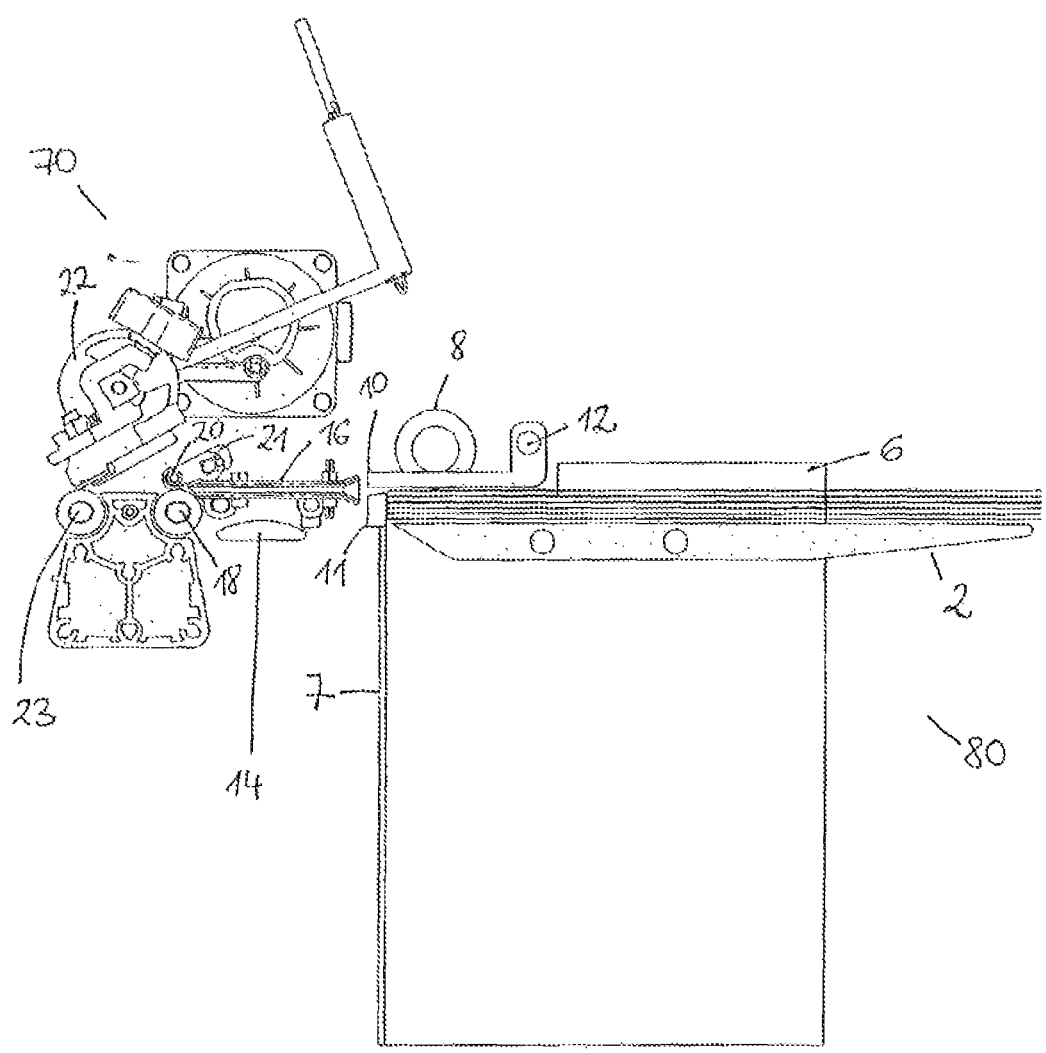

THERMOTRANSFER PRINTER WITH SINGLE SHEET INTAKE MEANS

This application is a national phase of International Application No. PCT/EP2005/004180, filed Apr. 19, 2005, which claims priority to DE 10 2004 019 070.4, filed on Apr. 20, 2004.

The invention concerns a thermotransfer printer for printing on print media having RFID labels. The thermotransfer printer has a thermotransfer printing unit and a single sheet intake means.

Sheet intake devices of the most widely varying kinds are regularly employed in printers in order to feed individual sheets from a stack of sheets, whereby an orderly printing operation is guaranteed. Previously known individual sheet intake devices are designed to transport the most widely varying sheet formats into the printer. In particular individual sheet intake means are suitable for also transporting flat articles such as plastic cards to the thermotransfer printing unit. Unlike sheets of paper plastic cards of that kind are very stiff and can quickly break if they are bent. Therefore previously known thermotransfer printers with a single sheet intake means have been developed, which ensure reliable guidance for a print medium to be transported, without causing deformation of the print medium, that is to say the sheet or the plastic card, during transport. Such a single sheet intake means is known in particular from European patent specification EP 0 694 488 B1.

A thermotransfer printer with single sheet intake means is suitable in particular for printing on print media which include RFID labels. An RFID label comprises a transponder and an antenna. The RFID label is adapted to transmit an identification as a reaction to a received electromagnetic signal. In other words, it is possible to have access to the RFID label by means of a writing/reading unit. The identification of the RFID label comprises a sequence of digits which uniquely identify the respective label. When a label of that nature is fixed to a product the product can thus be identified therewith. That is effected by means of the reading/writing unit. Information transmission between the RFID label and the reading unit is effected by way of radio frequency signals. That term is also used in particular to mean signals in the Gigahertz range and also in the range of some hundred Hertz. Infrared radiation and visible light do not belong thereto for the advantage of the RFID label is precisely that information exchange is substantially independent of temperature fluctuations or light conditions. The transponder and the antenna are in particular let into special sheets of paper or are integrated into a plastic card. The purpose of the transponder is to automatically generate a response to a demand or a received signal. In particular the identification of the RFID label is sent in the transponder, as a reaction to a received signal. The transponder represents in particular a data storage means as the identification of the RFID label is stored therein. Usually the transponder comprises a transistor circuit which is embodied by a microchip. The microchip has to be protected from environmental effects, in particular heat and applications of pressure. Transport of the print medium with the RFID label by means of the single sheet intake means firstly provides that the print medium including the RFID label is not bent in the printing operation.

When printing on print media which contain RFID labels, specific problems arise. In particular it is necessary to ensure that the RFID labels are not in any way damaged or adversely affected in the operation of printing on the print media. The connection between the transponder and the antenna breaks relatively easily. It is however absolutely necessary for the RFID label to operate. Such a break can occur in particular if the printing head of the thermotransfer printer applies an excessive pressure or an excessive temperature to the transponder and/or the antenna of the RFID label.

Accordingly the object of the invention is to ensure that there is no possibility of damage to the RFID labels when printing on print media containing RFID labels.

That object is attained by the printer as set forth in accompanying claim 1. This involves a thermotransfer printer with a thermotransfer printing unit and a single sheet intake means.

The printer also has an RFID reading unit. The reading unit is suitable for actuating RFID labels in order to read out items of information, in particular the identification of the RFID labels. The RFID reading unit can thus monitor at any time whether print media with RFID labels is being fed or printed upon at the present time. If there are no print media present, the RFID reading unit does not receive any signal subsequently to the emission of a query. If the RFID reading unit has received items of information from an RFID label, in particular the identification of the RFID labels, then the thermotransfer printer can be controlled in dependence on the items of information from the RFID label. The printer therefore automatically learns whether attention is to be paid to RFID labels which are present, in the printing operation, whereby damage to the RFID labels can be avoided.

Preferably there is provided a control unit which obtains items of information received from the RFID reading unit. The control unit controls the print in dependence on the received items of information. The thermotransfer printing unit normally naturally has a CPU and a working memory for controlling the printing unit. The CPU can function as a control unit which processes the items of information from the RFID reading unit. The CPU calls up items of information from the RFID reading unit. The information received from an RFID label can include in particular the nature of the print medium and of the RFID label. The thermotransfer printer according to the invention can thus appropriately react to the nature of the print medium and the label in order to avoid damage to the labels. The control unit provides that the printing heads are lifted off the print medium in the region of the RFID label so that the printing heads do not collide with the label. In particular items of information regarding the location of the label on the print medium and information as to whether printing can be effected in the region of the RFID label could be contained in the label. Finally, it would even be possible for the RFID label to specify what motif is to be printed on the print medium. That however would require the RFID labels having a relatively large memory. They would be relatively complex and expensive.

Preferably the RFID label transmits only its identification (ID). The identification is a sequence of digits which uniquely identifies the RFID label. All further items of information concerning the RFID label as well as the print medium and possibly the motif to be printed are stored in an identification memory of the control unit. If the control unit is embodied by the CPU and the working memory of the thermotransfer printing unit, the arrangement has a non-volatile memory (for example a hard disc) as the identification memory. All identifications of RFID labels to be printed are stored in the identification memory. Precisely one set of commands is associated with each identification. The set of commands includes all instructions with which the printer according to the invention is to be actuated in order to ensure trouble-free printing. Items of information concerning the motif to be printed can possibly also be called up by way of the identification. It would thus be additionally possible to ensure that the current print media are correctly printed in the printer. The print media themselves so-to-speak control implementation of the printing operation. For that purpose it is only necessary for the RFID reading unit to regularly query the identification of the RFID labels.

If a plurality of RFID labels are in the transmitting/receiving region of the RFID reading unit, then the RFID reading unit simultaneously receives a plurality of identifications of the respective RFID labels as a reaction to an enquiry. The RFID reading unit must therefore be put into the position of separating the signals received from the RFID labels. A number of access methods are known from radio technology, which permit a plurality of transmitters to be able to send their data to a single receiver, namely the RFID reading unit: SDMA (space division multiple access), TDMA (time domain multiple access), FDMA (frequency domain multiple access) and CDMA (code division multiple access). As in RFID technology the transponders only have a limited capacity and are to be produced as favourably as possible, the TDMA is primarily suited as the procedure involved. If the time axis is divided into a number of time portions and each RFID label transmits in another time portion, the signals received from the RFID reading unit can be separated in respect of time. In the case of FDMA the signals transmitted by the RFID labels are transmitted on different carrier frequencies. The carrier frequency signal is then amplitude-modulated in order to transmit information. Separation of the received signals in the RFID reading unit is then effected by frequency filters. It is also possible to use a combination of TDMA and FDMA.

Because of the fact that the transponders cannot detect whether further transponders are reacting to an enquiry from the RFID reading unit, collisions can nonetheless occur. They must be recognised and treated by the reading arrangement. Manchester encoding is a suitable signal encoding process which allows the RFID reading unit to detect whether a plurality of RFID labels are transmitting signals. Thereupon it is necessary to ensure by means of anti-collision procedures that the RFID labels transmit their identifications by means of one of the above-mentioned access processes, for example TDMA, in such a way that they can be separated by the reading unit. There are deterministic and probabilistic algorithms for that purpose.

A possible deterministic algorithm is the tree trunk algorithm. When that algorithm is used then, in each enquiry step, the RFID reading unit calls on all RFID labels which can be reached to send back their identification if the identification if part of a predetermined group of identifications. If a plurality of RFID labels respond to an enquiry, that is to say if a collision is detected, the reading unit, at the next enquiry, reduces the number of elements from the predetermined group. The group is reduced in size until only one RFID identification is sent back. The corresponding RFID label is thus recognised. The algorithm proceeds in a similar manner with the remaining identifications until all RFID labels are identified.

A possible probabilistic process for separating the RFID labels is the Aloha process. In the Aloha process the reading unit makes a number of time intervals available to the RFID labels. Each of the RFID labels randomly selects a time slot in which it responds. If the number of possible time slots is very much greater than the number of responding labels, there is a low probability that no one of the labels alone responds during a time slot. In other words it is improbable that there is no time slot in which only one label responds. The process for recognising the RFID labels comprises a plurality of enquiry rounds. As soon as the RFID reading unit has recognised an RFID label the corresponding transponder of the RFID label is switched into the mute condition so that in the next enquiry no response is received from that transponder.

When the reading unit has recognised a plurality of labels it can ascertain from the reduction in the received signal intensity from the RFID labels how far the labels are away from the RFID reading unit. As the labels are conveyed or moved along a given path through the printer, it is possible to infer the position of the respective labels. In that way it is possible at any time to monitor which printing media are being printed upon. Position detection could also be effected on the basis of the detected transit time or time delay to an enquiry from the reading unit.

The tree trunk process is particularly suitable for RFID label recognition. As the speed at which the RFID labels are transported through the printing unit is known, the RFID reading unit can predict on the basis of those items of information which of the detected RFID labels, at the next enquiry, will have left the transmitting/receiving region of the RFID reading unit, and in particular which of the known RFID labels are received. The RFID labels in respect of which it is expected that they are still within the transmitting/receiving region of the reading unit in the next enquiry are switched mute at the next enquiry. When a fresh RFID label is conveyed into the transmitting/receiving region of the RFID reading unit, that is the sole responding RFID label as all other RFID labels are switched into the mute condition. The complication and expenditure involved in identifying the RFID labels is thus greatly restricted.

An embodiment of the present invention is described hereinafter with reference to the accompanying Figure.

FIG. 1 shows a thermotransfer printer in accordance with the embodiment of the invention.

The thermotransfer printer shown in FIG. 1 includes a single sheet intake means. The single sheet intake means has a carrier 2 which can be moved upwardly and downwardly in the direction of the arrow. Print media to be printed upon are stacked one above the other on the carrier 2. The plane of the carrier is perpendicular to an abutment plane 6 which is disposed in the plane of the drawing and which serves as a sheet guide. A second abutment 7 is disposed perpendicularly to the plane of the carrier and the first abutment plane 6. The carrier 2 transports the print media continuously upwardly so that they can be successively delivered to the thermotransfer printer by way of a separating edge 11. A transport device 8 in roller form is arranged above the separating edge 11 and the transport device 8 in roller form is pressed onto the uppermost print medium and pushes it over the separating edge 11 into the thermotransfer printer. The transport device is connected to a pivot shaft 12 by way of an arm. The pivot shaft is perpendicular to the abutment plane 6. The separating edge 11 is arranged below the upper abutment of the pivot arm 10 in such a way that there is a sufficiently large space for the print medium to be passed through by means of the transport device 8 between the upper abutment and the separating edge. The spacing between the separating edge and the upper abutment is adjustable so that different print media can be conveyed by means of the single sheet intake means to the thermotransfer printing device.

The print medium conveyed by the single sheet intake means firstly passes through a tunnel guide 16 into the thermotransfer printer. The print medium includes an RFID label. Arranged beneath the tunnel guide 16 is an RFID reading and/or writing unit. As soon as the print medium with the RFID label passes the RFID reading unit the print medium is detected by the RFID reading unit. For that purpose the RFID reading unit continuously emits signals, calling on the RFID label to send back its identification.

The print medium finally passes between a drive roller 18 and a counterpressure backing roller 20. The drive roller 18 is shown in cross-section. It is cylindrical and transports the print medium to a printing head 22 of the illustrated thermotransfer printing unit. The two rollers 18 and 20 receive the print medium between them. The counterpressure roller 20 provides that the contact pressure of the drive roller 18 is sufficient to convey the print medium. The counterpressure roller 20 is fixed to a holder arm 21 pivotable about an axis. The counterpressure roller 20 is biased towards the drive roller 18. If however there are irregularities or projections on the print medium then the counterpressure roller 20 is not an obstruction to the irregularity but pivots yieldingly away from the arm 21.

Finally the print medium with the RFID label passes to the printing head 22. The illustrated printing head is a corner edge printing head. A printing head of that kind applies a relatively low pressure to the print medium. That therefore reduces from the outset the risk of the RFID label being damaged by the printing head. The printing head 22 applies items of information to the print medium by means of the known thermotransfer printing process. Disposed below the printing head 22 is a pressure roller 23 which transports the print medium beneath the printing head 22 out of the thermotransfer printing unit.

As soon as the RFID reading unit 14 identifies an RFID label, it controls the printing head 21 by way of a control unit (not shown). The control unit is embodied by the CPU and the working memory of the thermotransfer printing unit. The control unit commands the printing head 22 to execute a given printing application which is stored with the identification of the respective RFID label. In that case care is taken to ensure that the printing head 22 is lifted off the print medium as soon as the RFID label in the print medium reaches the printing head 22. In that way the RFID label cannot be damaged by the printing head 22.

The invention claimed is:

1. A thermotransfer printer for printing print media having RFID labels, comprising:
   a thermotransfer printing unit containing a printing head that applies pressure to the print media, and
   a single sheet intake means,
   an RFID reading unit for reading items of information from a RFID device in the RFID labels, wherein the RFID reading unit is so connected to the thermotransfer printing unit that the thermotransfer printing unit is controllable in dependence on the items of information read out of the respective RFID label, and
   the printing head is controlled by a CPU control unit such that the CPU control unit directs the printing head to lift off the RFID label when the RFID device in a print medium reaches the printing head and does not cause damage to the RFID device.

2. A printer according to claim 1, further comprising a control unit which is adapted to receive items of information read out from the RFID reading unit and to control the thermotransfer printing unit in dependence on the received items of information.

3. A printer according to claim 1, wherein the RFID reading unit is adapted to read out an identification of the labels, and the CPU control unit has an identification memory for storing identifications of the RFID labels to be printed by the printer, wherein precisely one set of commands is associated with each identification in the identification memory.

4. A printer according to claim 1, wherein the CPU control unit is adapted to control the thermotransfer printing unit in such a way that a predetermined motif is printed on the print media at a predetermined location in dependence on the received information from the RFID labels.

5. A printer according to claim 1, wherein the RFID reading unit, comprises
   a collision detector which is adapted by using suitable signal encoding to recognize whether a plurality of RFID labels are in a transmitting/receiving region of the reading device, and
   an access unit which is adapted to access a plurality of RFID labels by means of an access process, and to identify the RFID labels by means of a deterministic algorithm.

6. A printer according to claim 5, wherein the RFID reading unit comprises a position detection unit which is adapted to detect a transit time and/or intensity of a signal received from a given RFID label and to determine the position of the given RFID label relative to the RFID reading unit on the basis of the transit time and/or intensity of the signal from the given RFID label.

7. A printer according to claim 6, wherein the position detection unit identifies the printing media containing an RFID device being printed on by the thermotransfer printer.

8. A printer according to claim 5 wherein the signal encoding is Manchester encoding.

9. A printer according to claim 5 wherein the access process includes SDMA, TDMA, FDMA or CDMA.

10. A printer according to claim 5 wherein the deterministic algorithm includes a tree search algorithm.

11. A printer according to claim 5, wherein the deterministic algorithm includes a probabilistic algorithm.

12. A printer according to claim 11, wherein the probabilistic algorithm includes an Aloha algorithm.

13. A printer according to claim 1, wherein the printing head is a corner edge printing head.

14. A thermotransfer printer for printing print media having RFID labels, comprising;
   a sheet intake having a carrier in a plane;
   print media having a plurality of RFID labels provided on the carrier, with at least one of the labels having a RFID device, the carrier transports the print media upwardly;
   a transport roller adjacent an edge of the supply of print media to transport the one of the supply of print media through a drive roller and a backing roller, the backing roller is biased toward the drive roller and is pivoted about an axis into and out of engagement with the one of the supply of print media;
   a RFID reader positioned prior to the printing head for reading the RFID device in one of the labels, and
   a printing head adjacent the driver roller and backing roller controlled by a control unit, the printing head directed to lift off one of the supply of print media by the control unit when the RFID reader detects one of the labels having a RFID device that is present at the drive roller.

15. A printer according to claim 14, wherein the printing head is a corner edge printing head.

16. A printer according to claim 14, wherein a pressure roller is disposed beneath the printing head.

17. A printer according to claim 14, including a separating edge adjacent an edge of the print media and beneath the transport roller.

* * * * *